United States Patent [19]
Schuster et al.

[11] Patent Number: 6,005,048
[45] Date of Patent: Dec. 21, 1999

[54] PROCESS FOR THE PREPARATION OF STORAGE-STABLE ORGANOPOLYSILOXANE COMPOSITIONS COMPRISING OXIDIC REINFORCING FILLERS

[75] Inventors: Johann Schuster; Horst Müller, both of Emmerting, Germany; Johann Mersch, Duttendorf, Austria; Heinrich Glöcklhofer; Anton Maier, both of Burghausen, Germany

[73] Assignee: Wacker-Chemie GmbH, Munich, Germany

[21] Appl. No.: 08/740,683

[22] Filed: Nov. 1, 1996

[30] Foreign Application Priority Data

Dec. 5, 1995 [DE] Germany .................. 195 45 365

[51] Int. Cl.$^6$ ..................................... C08J 5/54
[52] U.S. Cl. .......... 524/731; 524/266; 524/379; 524/385; 524/389; 524/492; 524/730; 524/765; 524/766; 524/847; 524/862; 524/866
[58] Field of Search .................. 524/765, 766, 524/385, 389, 379, 847, 492, 730, 731, 266, 862, 866

[56] References Cited

U.S. PATENT DOCUMENTS 5,036,117  7/1991  Chung ........................ 528/15
5,057,151  10/1991  Schuster et al. .
5,126,389  6/1992  Ona ........................... 524/379

*Primary Examiner*—Patricia A. Short
*Attorney, Agent, or Firm*—Brooks & Kushman P.C.

[57] ABSTRACT

The organopolysiloxane compositions are prepared by mixing (1) organopolysiloxanes which contain on average at least 2 aliphatic carbon-carbon multiple bonds per molecule, (2) prehydrophobized oxidic reinforcing fillers having a carbon content, obtained by the hydrophobizing, of at least 0.5% by weight and (3) compounds which are chosen from (3a) silanol compounds of the formula $$R\text{---}[SiR_2\text{---}O\text{---}]_aH \qquad (I)$$

in which

R is identical or different monovalent, $C_1$- to $C_{10}$-hydrocarbon radicals which are free from aliphatic carbon-carbon multiple bonds and a has values from 1 to 10, and (3b) saturated $C_1$- to $C_{18}$-alkanols.

20 Claims, No Drawings

PROCESS FOR THE PREPARATION OF STORAGE-STABLE ORGANOPOLYSILOXANE COMPOSITIONS COMPRISING OXIDIC REINFORCING FILLERS

FIELD OF INVENTION

The present invention relates to a process for the preparation of storage-stable organopolysiloxane compositions which crosslink by addition and comprise a prehydrophobized reinforcing filler and a compound chosen from a linear silanol compound and saturated alkanol.

BACKGROUND OF INVENTION

Compositions of organopolysiloxane and hydrophobic oxidic reinforcing filler can be prepared by two basic processes:

In the first process, hydrophilic filler and organopolysiloxane are mixed in the presence of a hydrophobizing agent for the filler. However, the process has the disadvantage of a long batch running time and high emissions, which occur at many points and are difficult to control. Specific control of the hydrophobizing is scarcely possible, and corrections to the filler contents of the compositions are no longer possible, since suitable fillers are lacking.

In the second process, prehydrophobized filler and organopolysiloxane are mixed. A process for hydrophobizing oxidic reinforcing filler is described in U.S. Pat. No. 5,057,151 where the hydrophilic filler is subjected to mechanical stress in an excess of hydrophobizing agent. Excess hydrophobizing agent is then removed and recycled to the process.

During prehydrophobizing of the filler, it is possible to control the degree of hydrophobizing specifically and to vary it within wide limits, high and/or uniform degrees of hydrophobizing being possible, which is a prerequisite for many uses. The prehydrophobizing process allows the filler to be hydrophobized such that crosslinkable organopolysiloxane compositions can be prepared by simple mixing of the hydrophobized filler with organopolysiloxane. The use of previously hydrophobized filler leads to a significant increase in the capacity of the mixing units. Emissions are limited to a central unit and as a result are easier to control. The consumption of hydrophobizing agent can be reduced significantly compared with the in situ process. The filler content of the compositions can easily be corrected by addition of further filler.

Organopolysiloxane compositions which comprise a prehydrophobized reinforcing filler, such as pyrogenically prepared silicic acid, show an increase in viscosity during storage. For example, the increase in viscosity can be so severe that after a storage time of a few weeks the mass shows rubber-elastic properties and therefore is no longer processible. In the case of peroxidically crosslinking organopolysiloxane compositions, the increase in viscosity can be compensated for by addition of a low-viscosity organopolysiloxane. This is not possible in the case of organopolysiloxane compositions which crosslink by addition.

SUMMARY OF INVENTION

The present invention is based on the object of reducing the increase in viscosity, during storage, of base mixtures comprising prehydrophobized reinforcing fillers for organopolysiloxane compositions which crosslink by addition, and of components comprising prehydrophobized reinforcing fillers for organopolysiloxane compositions which crosslink by addition.

The present invention relates to a process for the preparation of organopolysiloxane compositions in which
(1) organopolysiloxanes which contain on average at least 2 aliphatic carbon-carbon multiple bonds per molecule,
(2) prehydrophobized oxidic reinforcing fillers having a carbon content, obtained by the hydrophobizing, of at least 0.5% by weight and
(3) compounds chosen from (3a) silanol compounds of the formula $$R-[SiR_2-O-]_aH \qquad (I)$$

in which
R is identical or different monovalent, $C_1$- to $C_{10}$- hydrocarbon radicals which are free from aliphatic carbon-carbon multiple bonds and
a has values from 1 to 10, and (3b) saturated $C_1$- to $C_{18}$-alkanols are mixed.

In formula I, a preferably has values of not more than 6, in particular the values 1, 2 or 3.

The hydrocarbon radicals R can be $C_1$- to $C_{10}$-alkyl, $C_6$- to $C_{10}$-alkaryl or $C_6$- to $C_{10}$-aralkyl radicals, the alkyl part of which is saturated, or $C_6$- to $C_{10}$-aryl radicals.

Examples of alkyl radicals R are the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl and cyclohexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; and cycloalkyl radicals, such as the cyclohexyl radical.

Examples of alkaryl radicals R are the α- and β-phenylethyl radical; examples of aralkyl radicals R are the benzyl radical and the 2,4-diethylbenzyl radical; and examples of aryl radicals R are the phenyl radical and the naphthyl radical.

Preferably, R is $C_1$- to $C_6$-alkyl radicals and phenyl radicals, in particular methyl and ethyl radicals. Preferred silanol compounds (3a) are trimethylsilanol and pentamethyldisiloxanol.

Examples of saturated $C_1$- to $C_{18}$-alkanols (3b) are methanol, ethanol, n-propanol, iso-propanol, 1-n-butanol, 2-n-butanol, iso-butanol, 1-n-pentanol, iso-pentanol and neo-tertpentanol; hexanols, such as 1-n-hexanol; heptanols, such as 1-n-heptanol; octanols, such as 1-n-octanol; nonanols, such as 1-n-nonanol; decanols, such as 1-n-decanol; 1-n-dodecanol, 1-n-tetradecanol, 1-n-hexadecanol and stearyl alcohol; and cycloalkanols, such as cyclohexanol.

The saturated $C_3$- to $C_8$-alkanols (3b) are preferred, in particular the branched alkanols.

The prehydrophobized oxidic reinforcing fillers (2) are preferably prehydrophobized pulverulent fillers, such as pyrogenically prepared silicic acid, precipitated silicic acid and silicon/aluminum mixed oxides, or fibrous fillers, such as asbestos. One type of filler, or a mixture of at least two fillers can be used. The carbon content of the fillers (2) obtained by the hydrophobizing is at least 1% by weight, and preferably not more than 6% by weight. In the determination of the carbon content of the fillers (2), it is ensured by drying for at least 2 hours at not less than 200° C. that the carbon content measured is based on the hydrophobizing layer of the fillers (2).

Preferred reinforcing fillers (2) are pyrogenically prepared silicic acid and precipitated silicic acid. The BET surface area of the fillers (2) is at least 50 m²/g, preferably at least 100 m²/g, more preferably at least 150 m²/g.

The fillers (2) are hydrophobized by treatment with, for example, organosilanes, -silazanes or -siloxanes, or by etherification of hydroxyl groups to alkoxy groups. A preferred process for the hydrophobizing is described in U.S. Pat. No. 5,057,151.

Linear or branched organopolysiloxanes of units of the formula $$R^1_c R^2_d SiO_{\frac{4-c-d}{2}}, \quad (II)$$

in which
R$^1$ is a monovalent C$_1$- to C$_{10}$-hydrocarbon radical which is optionally substituted by halogen atoms and free from aliphatic carbon-carbon multiple bonds,
R$^2$ is a hydrogen atom, hydroxyl group or monovalent hydrocarbon radical having an aliphatic carbon—carbon multiple bond and 2 to 8 carbon atoms per radical,
c is 0, 1, 2 or 3 and
d is 0, 1 or 2,
with the proviso that on average at least 2 radicals R$^2$ are present per molecule, are preferably used as the organopolysiloxanes (1).

The organopolysiloxanes (1) have an average viscosity of at least 100, in particular at least 1000 mPa.s, and preferably not more than 10$^6$, more preferably not more than 1 mpa.s at 25° C.

Examples of unsubstituted hydrocarbon radicals R$^1$ are the examples of hydrocarbon radicals which are free from aliphatic carbon-carbon multiple bonds listed for R. Examples of hydrocarbon radicals R$^1$ substituted by halogen atoms are the 3,3,3-trifluoro-n-propyl radical, the 2,2,2,2',2',2'-hexafluoroisopropyl radical, the heptafluoroisopropyl radical, the 3-chloro-n-propyl radical, the 2-ethyl bromide radical and the 3-propyl bromide radical.

Preferably, R$^1$ is a C$_1$- to C$_6$-hydrocarbon radical, in particular methyl, ethyl and phenyl radicals. Preferably, the radical R$^1$ is not substituted.

Examples of monovalent hydrocarbon radicals R$^2$ with an aliphatic carbon-carbon multiple bond having 2 to 8 carbon atoms per radical are alkenyl radicals, such as the vinyl, 5-hexenyl, 1-propenyl, allyl, 1-butenyl and 1-pentenyl radical; and alkynyl radicals, such as the ethinyl, propargyl and 1-propinyl radical.

The organopolysiloxanes (1) preferably have at least 90, more preferably at least 95 mole % of units of formula II in which the sum c+d=2.

The organopolysiloxanes (1) have at least 60, preferably at least 80, more preferably at least 95 mole % of units of formula II in which d has the value 0.

Preferably, at least 5, preferably at least 10, in particular at least 20 parts by weight, and not more than 200, preferably not more than 150, in particular not more than 100 parts by weight of reinforcing fillers (2) are used per 100 parts by weight of the organopolysiloxanes (1).

Preferably, a total of at least 0.01, in particular at least 0.05 part by weight and not more than 5, in particular not more than 1 part by weight of silanol compounds (3a) and/or saturated C$_1$- to C$_{18}$-alkanols (3b) are used per 100 parts by weight of the organopolysiloxanes (1).

The storage-stable multi-component systems for organopolysiloxane compositions which crosslink by addition are prepared by the above process by mixing the constituents
(1a) an organopolysiloxane which contains radicals having aliphatic carbon-carbon multiple bonds, and
(1b) an organopolysiloxane with Si-bonded hydrogen atoms, or, instead of organopolysiloxanes (1a) and (1b),
(1c) an organopolysiloxane which contains radicals with aliphatic carbon-carbon multiple bonds and Si-bonded hydrogen atoms, and
(2) reinforcing fillers and
(3) a compound chosen from the silanol compound (3a) and the saturated C$_1$- to C$_{18}$-alkanol (3b),
(4) a transition metal catalyst and
(5) inhibitors.

The individual constituents (1a) through (5) are mixed together in a two or more component system in any combination with the proviso that the transition metal catalyst is not present in a component containing an organopolysiloxane (1b) or (1c).

The organopolysiloxanes which crosslink by addition are prepared by blending the components containing the above constituents.

During storage of the crosslinkable organopolysiloxane compositions, the transition metal catalyst (4) and the organopolysiloxanes (1c) which contain radicals with aliphatic carbon-carbon multiple bonds and Si-bonded hydrogen atoms are kept separate. The transition metal catalyst (4) and the organopolysiloxanes (1b) which contain Si-bonded hydrogen atoms are also kept separate.

Preferably, the compounds (3) are added during blending of the components from the constituents (1a) to (5).

Linear or branched organopolysiloxanes of units of the above mentioned formula II are preferably used as the organopolysiloxanes (1a–c).

The organopolysiloxanes (1a) contain on average 2 to 10, preferably 2 to 4, aliphatic carbon-carbon multiple bonds per molecule. The terminal units of formula II preferably contain aliphatic carbon-carbon multiple bonds. The aliphatic carbon-carbon multiple bonds are preferably double bonds.

The organopolysiloxanes (1a) have an average viscosity of at least 100, in particular at least 1000 mPa.s, and preferably not more than 10$^5$, more preferably not more than 5×10$^4$ mPa.s at 25° C.

The organopolysiloxanes (1b) with Si-bonded hydrogen atoms contain on average 2 to 50, preferably 5 to 20, Si-bonded hydrogen atoms per molecule.

The organopolysiloxanes (1b) preferably have an average viscosity of at least 10, in particular at least 30 mpa.s, and preferably not more than 5000, in particular not more than 1000 mPa.s at 250° C.

The organopolysiloxanes (1c) which contain radicals with aliphatic carbon-carbon multiple bonds and Si-bonded hydrogen atoms preferably have an average viscosity of at least 100, in particular at least 1000 mpa.s, and preferably not more than 10$^5$, in particular not more than 5×10$^4$ mPa.s at 25° C.

The ready-to-use organopolysiloxane compositions which crosslink by addition and are prepared by blending the components preferably have a viscosity of at least 1000 mPa.s at 250° C.

Platinum metals and/or compounds thereof, preferably platinum and/or compounds thereof, are used as the transition metal catalysts (4). All the catalysts which have been used to date for addition of hydrogen atoms bonded directly to Si atoms on to aliphatically unsaturated compounds can be used here. Examples of such catalysts are metallic and finely divided platinum, which can be on supports, such as silicon dioxide, aluminum oxide or active charcoal, and compounds or complexes of platinum, such as platinum halides, for example PtCl$_4$, H$_2$PtCl$_6$•6H$_2$O or Na$_2$PtCl$_4$·4H$_2$O, platinum-olefin complexes, platinum-alcohol complexes, platinum-alcoholate complexes, platinum-ether complexes, platinum-aldehyde complexes, platinum-ketone complexes, including reaction products of H$_2$PtCl$_6$·6H, and cyclohexanone, platinum-vinylsiloxane complexes, in particular platinum-divinyltetramethyldisiloxane complexes, with or without a content of detectable inorganically bonded halogen, bis(gamma-picoline)platinum dichloride, trimethylenedipyridineplatinum dichloride, dicyclopentadieneplatinum dichloride, dimethylsulfoxideethyleneplatinum(II) dichloride and reaction products of platinum tetrachloride with an olefin and primary amine or secondary amine or primary and secondary amine, such as the reaction product of platinum tetrachloride, dissolved in 1-octene, with secbutylamine, or ammonium-platinum complexes.

The transition metal catalyst (4) is used in amounts of 0.5 to 500 ppm by weight (parts by weight per million parts by weight), in particular 2 to 400 ppm by weight, calculated as the elemental transition metal and based on the total weight of the organopolysiloxanes (1a–c). Most of the above mentioned transition metal catalysts are active to the extent that an inhibitor which prevents premature crosslinking to give the elastomer must be added to the crosslinkable organopolysiloxane compositions. Such inhibition is not necessary if ammonium-platinum complexes are used.

The inhibitors (5) are known. Examples of these are acetylenically unsaturated alcohols, such as 3-methyl-1-butin-3-ol, 1-ethinylcyclohexan-1-ol, 3,5-dimethyl-1-hexin-3-ol and 3-methyl-1-pentin-3-ol.

Examples of vinylsiloxane-based inhibitors (5) are 1,1,3,3-tetramethyl-1,3-divinylsiloxane and poly-, oligoand disiloxanes containing vinyl groups.

In multicomponent systems which can be crosslinked by addition, such as liquid rubbers, it is necessary for a mixture of the components to remain processible for a long time at a low temperature. However, at elevated temperature, very rapid vulcanization must proceed in order to ensure high productivity in shaping processes, such as the injection molding technique.

The long pot life at a low temperature is achieved by the presence of inhibitors. However, the customary inhibitors (5), such as ethinylcyclohexanol or methylbutinol, increase the temperature at which the vulcanization starts, called the kick-off temperature. The kick-off temperature is increased with an increasing amount of inhibitor. The maximum amount of inhibitor is therefore limited by the desired kick-off temperature. If the kick-off temperature is too high, for example above 125° C., disturbances in vulcanization also occur at elevated temperature.

The addition of the silanol compounds (3a) to organopolysiloxane compositions which can be crosslinked by addition has the effect that vulcanization is inhibited significantly at low temperatures, but the kick-off temperature is not influenced. As a result, it becomes possible to prepare organopolysiloxane compositions which can be crosslinked by addition and have a long pot life at low temperatures and at the same time a low kick-off temperature.

Unless stated otherwise, in the following examples
a) all amounts data are based on the weight;
b) all pressures are 0.10 MPa (absolute);
c) all temperatures are 20° C.

EXAMPLE 1
Preparation of a base mixture for organopolysiloxane compositions which can be crosslinked by addition, by means of prehydrophobized filler 2.4 kg of a dimethylpolysiloxane terminated with vinyl groups and having a viscosity of 7000 mPa.s are initially introduced into a 15 liter laboratory kneader, the kneader is heated up to 150° C. and 1.8 kg of hydrophobic, pyrogenic, highly disperse silicic acid Wacker HDKF SKS 130 from Wacker-Chemie GmbH, Munich are incorporated over a period of 1 hour. The mixture is then kneaded at a temperature of 100° C. under a gentle stream of inert gas for about 1 hour and the mass is diluted with 2.0 kg of a dimethylpolysiloxane terminated with vinyl end groups and having a viscosity of 7000 mPa.s.

EXAMPLE 2
Improvement according to the invention in the storage stability of a base mixture prepared according to Example 1 by addition of trimethylsilanol The increase in the viscosity for a base mixture without, according to Example 1, and with, according to Example 2, addition of 0.3% by weight of trimethylsilanol is shown in the following Table I. Trimethylsilanol is added during dilution with the dimethylpolysiloxane described in Example 1. The storage temperature is 20° C.

TABLE I

| Storage time in days | 0 | 20 | 32 | 49 | 60 | 77 |
|---|---|---|---|---|---|---|
| Example 1 viscosity [1000 mPa.s] | 165 | 379 | 538 | 621 | 767 | 1094 |
| Example 2 viscosity [1000 mPa.s] | 145 | 174 | 179 | 183 | 192 | 198 |

Comparison Example 3
Preparation of a liquid rubber A and B component with a short pot life at room temperature A component is prepared by admixing a platinum catalyst to 1 kg of base mixture from Example 1. The platinum concentration, based on the total A component, is 3.0 ppm. 0.6 g of ethinylcyclohexanol is furthermore also mixed in.

The B component comprises 1 kg of base mixture from Example 1 and 45 g of a linear polydimethylsiloxane having an Si-H concentration of about 0.5% by weight and a viscosity of 300 mpa.s, as the crosslinking agent, and 0.6 g of ethinylcyclohexanol.

The A and B components are mixed in a ratio of 1:1 and about 5 g of this mixture are introduced into a snap-lid glass and stored at room temperature. After 5 hours and 24 hours, the consistency is tested with a spatula. Elastic properties are to be found after only 5 hours.

EXAMPLE 4
Preparation according to the invention of a liquid rubber A and B component with a long pot life at room temperature A and B components are prepared analogously to Example 3, with the difference that 0.3% by weight of trimethylsilanol is mixed into the base mixture.

A blend of A and B component is unchanged in consistency after 1 day at room temperature. Even after storage at room temperature for 3 days, hardly any change in consistency is to be detected.

EXAMPLE 5
Improvement according to the invention in the storage stability of a B component prepared according to Example 3 by addition of trimethylsilanol B components were tested, since these are as a rule less stable and therefore more significant effects occur.

The increase in the viscosity of a B component without, according to Example 3, and with, according to Example 4, addition of 0.3% by weight of trimethylsilanol is shown in Table II. The storage temperature is 20° C.

TABLE II

| Storage time in days | 0 | 7 | 14 | 21 | 28 | 35 |
|---|---|---|---|---|---|---|
| Example 3 viscosity [1000 mPa.s] | 542 | 1238 | 1701 | 2091 | 2358 | 2974 |
| Example 4 viscosity [1000 mPa.s] | 519 | 520 | 521 | 521 | 524 | 525 |

What is claimed is:

1. A process for the preparation of an organopolysiloxane composition, said process comprising mixing:
    (1) an organopolysiloxane which contains on average at least 2 aliphatic carbon-carbon multiple bonds per molecule,
    (2) a prehydrophobized oxidic reinforcing filler having a carbon content, obtained by the hydrophobizing, of at least 0.5% by weight, and
    (3) a silanol compound of the formula $$R-[SiR_2-O-]_aH \quad (I)$$

in which
    R is identical or different monovalent, $C_1$- to $C_{10}$-hydrocarbon radicals which are free from aliphatic carbon-carbon multiple bonds and
    a has values from 1 to 10;
    wherein R is selected from the group consisting of $C_1$- to $C_6$-alkyl radicals.

2. The process as claimed in claim 1, where a in formula (I) has a value of 1, 2 or 3.

3. The process claimed in claim 1 wherein R consists essentially of methyl and ethyl radicals.

4. The process as claimed in claim 1 wherein the (1) organopolysiloxane has an average viscosity of not more than about $10^5$ mPa.s at 25° C.

5. The process as claimed in claim 1, where the organopolysiloxane (1) is a linear or branched organopolysiloxane of units of the formula $$R_c^1R_d^2SiO_{\frac{4-c-d}{2}}, \quad (II)$$

in which
    $R^1$ is a monovalent $C_1$- to $C_{10}$-hydrocarbon radical optionally substituted by halogen atoms and free from aliphatic carbon-carbon multiple bonds,
    $R^2$ is a hydrogen atom, hydroxyl group or monovalent hydrocarbon radical having an aliphatic carbon-carbon multiple bond with 2 to 8 carbon atoms per radical,
    c is, 0, 1, 2 or 3 and
    d is 0, 1 or 2,
    with the proviso that on average at least 2 radicals $R^2$ are present per molecule.

6. The process as claimed in claim 5, where the organopolysiloxane (1) contains at least 90 mole % of units of formula II in which the sum c+d is 2.

7. A process as claimed in claim 1 wherein the compound (3) is present in an amount of 0.01 to about 5 parts by weight per 100 parts by weight of the organopolysiloxane (1).

8. A process for the preparation of storage-stable multi-components for an organopolysiloxane composition which crosslibks by addition, wherein the components are prepared by mixing the constituents
    (1) addition crosslinkable components comprising one or more of:
        (1a) an organopolysiloxane which contains radicals with aliphatic carbon-carbon multiple bonds, and
        (1b) an organopolysiloxane with Si-bonded hydrogen atoms, or,
        (1c) an organopolysiloxane which contains radicals with aliphatic carbon-carbon multiple bonds and Si-bonded hydrogen atoms,
    with the proviso that said addition crosslinkable components (1) contain both Si-bonded hydrogen atoms and aliphatic carbon-carbon multiple bonds, and
    (2) a reinforcing filler and
    (3) a silanol compound of the formula $$R-[SiR_2-O-]_aH \quad (I)$$

in which
    R is identical or different monovalent, $C_1$- to $C_{10}$-hydrocarbon radicals which are free from aliphatic carbon-carbon multiple bonds and
    a has values from 1 to 10;
    wherein R is selected from the group consisting of $C_1$- to $C_6$-alkyl radicals
    (4) a transition metal catalyst and
    (5) an inhibitor, other than (3),
    with the proviso that the transition metal catalyst (4) is not present in a component containing (1b) or (1c).

9. The process claimed in claim 8 wherein R consists essentially of methyl and ethyl radicals.

10. The process as clained in claim 8 wherein the (1) organopolysiloxane has an average viscosity of not more than about $10^5$mPa.s at 25° C.

11. A process as claimed in claim 8 wherein the reinforcing filler (2) is a prehydrophobized oxidic reinforcing filler having a carbon content, obtained by the hydrophobizing, of at least 0.5% by weight.

12. A process for the preparation of an organopolysiloxane composition, said process comprising mixing:
    (1) an organopolysiloxane which contains on average at least 2 aliphatic carbon-carbon multiple bonds per molecule,
    (2) a prehydrophobized oxidic reinforcing filler having a carbon content, obtained by the hydrophobizing, of at least 0.5% by weight, and
    (3) a silanol compound of the formula $$R-[SiR_2-O-]_aH \quad (I)$$

in which
    R is identical or different monovalent, $C_1$- to $C_{10}$-hydrocarbon radicals which are free from aliphatic carbon-carbon multiple bonds and
    a has values from 1 to 10;
    wherein the silanol compound is trimethylsilanol.

13. The process as claimed in claim 12, where the reinforcing filler (2) is a pyrogenically prepared silicic acid or precipitated silicic acid having a BET surface area of at least 50 $m^2/g$.

14. The process as claimed in claim 12, where the organopolysiloxane (1) is a linear or branched organopolysiloxane of units of the formula $$R^1_c R^2_d SiO_{\frac{4-c-d}{2}}, \quad (II)$$

in which
R$^1$ is a monovalent C$_1$- to C$_{10}$-hydrocarbon radical optionally substituted by halogen atoms and free from aliphatic carbon-carbon multiple bonds,
R$^2$ is a hydrogen atom, hydroxyl group or monovalent hydrocarbon radical having an aliphatic carbon-carbon multiple bond with 2 to 8 carbon atoms per radical,
c is 0, 1, 2 or 3 and
d is 0, 1 or 2,
with the proviso that on average at least 2 radicals R$^2$ are present per molecule.

15. The process as claimed in claim 14, where the organopolysiloxane (1) contains at least 90 mole % of units of formula II in which the sum c+d is 2.

16. The process as claimed in claim 12, where at least 0.01 part by weight of the compound (3) is used per 100 parts by weight of the organopolysiloxane (1).

17. A process as claimed in claim 12 wherein the compound (3) is present in an amount of 0.01 to about 5 parts by weight per 100 parts by weight of the organopolysiloxane (1).

18. A process for the preparation of storage-stable multi-components for an organopolysiloxane composition which crosslinks by addition, wherein the components are prepared by mixing the constituents (1) addition crosslinkable components comprising one or more of:
(1a) an organopolysiloxane which contains radicals with aliphatic carbon-carbon multiple bonds, and
(1b) an organopolysiloxane with Si-bonded hydrogen atoms, or,
(1c) an organopolysiloxane which contains radicals with aliphatic carbon-carbon multiple bonds and Si-bonded hydrogen atoms, with the proviso that said addition crosslinkable components (1) contain both Si-bonded hydrogen atoms and aliphatic carbon-carbon multiple bonds, and (2) a reinforcing filler and
(3) a silanol compound
(4) a transition metal catalyst and
(5) an inhibitor, other than (3), with the proviso that the transition metal catalyst
(4) is not present in a component containing (1b) or (1c);
wherein the silanol compound is trimethylsilanol.

19. A process as claimed in claim 18 wherein the catalyst (4) comprises platinum.

20. A process as claimed in claim 18 wherein the reinforcing filler (2) is a prehydrophobized oxidic reinforcing filler having a carbon content, obtained by the hydrophobizing, of at least 0.5% by weight.

* * * * *